(12) United States Patent
Xu

(10) Patent No.: US 9,008,701 B2
(45) Date of Patent: Apr. 14, 2015

(54) MULTIMEDIA BROADCAST AND MULTICAST SERVICE NOTIFICATION IN LONG TERM EVOLUTION

(75) Inventor: Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2285 days.

(21) Appl. No.: 11/771,401

(22) Filed: Jun. 29, 2007

(65) Prior Publication Data

US 2008/0233974 A1    Sep. 25, 2008

Related U.S. Application Data

(60) Provisional application No. 60/895,672, filed on Mar. 19, 2007.

(51) Int. Cl.
| | | |
|---|---|---|
| H04W 68/00 | (2009.01) | |
| H04W 76/00 | (2009.01) | |
| H04W 68/02 | (2009.01) | |
| H04W 72/00 | (2009.01) | |

(52) U.S. Cl.
CPC .......... *H04W 76/002* (2013.01); *H04W 68/02* (2013.01); *H04W 72/005* (2013.01)

(58) Field of Classification Search
USPC ......................................................... 455/458
See application file for complete search history.

(56) References Cited

U.S. PATENT DOCUMENTS

| | | | | |
|---|---|---|---|---|
| 2004/0176112 A1* | 9/2004 | Beckmann et al. | ........... | 455/458 |
| 2005/0164719 A1* | 7/2005 | Waters | ............ | 455/458 |
| 2007/0155390 A1* | 7/2007 | Patabandi et al. | ............ | 455/450 |
| 2008/0227449 A1* | 9/2008 | Gholmieh et al. | ............ | 455/434 |

FOREIGN PATENT DOCUMENTS

| | | |
|---|---|---|
| EP | 1 283 648 A1 | 2/2003 |
| GB | 2 409 952 | 7/2005 |
| JP | 2004-538731 A | 12/2004 |
| JP | 2005-204305 | 7/2005 |
| WO | WO 03/015440 A1 | 2/2003 |

OTHER PUBLICATIONS

"3GPP TS 25.346 V6.9.1" (Sep. 2006).*
3GPP TS 25.346 V7.2.0 [online],Introduction of the Multimedia Broadcast Multicast Service [retrieved on Mar. 28, 2007], Retrieved from the Internet<URL:http:www.3gpp.org>.
3GPP TS 25.304 V7.0.0 Tech. Spec. [online],User Equipment (UE) Procedures in Idle Mode [retrieved on Mar. 28, 2007], Retrieved from the Internet<URL:http:www.3gpp.org>.

(Continued)

*Primary Examiner* — Wayne Cai
(74) *Attorney, Agent, or Firm* — Brooks Acordia IP Law, PC; Pejman Yedidsion; David Ripma

(57) ABSTRACT

Methods, devices, and systems have various user equipment (UE) for reading multimedia broadcast and multicast service (MBMS) notifications via one or more paging indicators of a Paging Indication Channel (PICH). The paging indicators of the PICH functions as MBMS notification indicators, signaling the relevant UE to read the MBMS point-to-multipoint control channel (MCCH) for MBMS information, and thereby enabling the affected UE to configure themselves to receive the associated multimedia broadcast and/or multicast service.

28 Claims, 7 Drawing Sheets

(56) References Cited

OTHER PUBLICATIONS

3GPP TS 25.211 V7.0.0 [online], Physical Channels and Mapping of Transport Channels [retrieved on Mar. 28, 2007], Retrieved from the Internet<URL:http:www.3gpp.org>.

"MICH Reception," 3GPP TSG-RAN-WG2 Meeting #57, Feb. 12-16, 2007, R2-070712, Nokia, St. Louis, USA.

International Search report dated May 20, 2008 for PCT Serial No. PCT/JP2008/055606.

Office action for U.S. Appl. No. 11/684,934 mailed Jan. 25, 2010.

* cited by examiner

MULTIMEDIA BROADCAST AND MULTICAST SERVICE NOTIFICATION IN LONG TERM EVOLUTION

CROSS-REFERENCE TO RELATED APPLICATIONS

This application claims the benefit of U.S. Provisional Patent Application Ser. No. 60/895,672 filed Mar. 19, 2007, entitled "Method and System of Multimedia Broadcast and Multicast Service Notification in Long Term Evolution," which is hereby incorporated by reference herein in its entirety including all appendixes, if any, for all purposes.

FIELD OF THE INVENTION

The embodiments of the present invention relate to Multimedia Broadcast and Multicast Services (MBMS), particularly receiving Modified Services Information, in a Radio Access Network (RAN) in Long Term Evolution (LTE).

BACKGROUND

The 3rd Generation Partnership Project, also referred to as 3GPP™, is a collaboration agreement that aims to define globally applicable Technical Specifications and Technical Reports for 3rd Generation Systems. Multimedia Broadcast Multicast Service (MBMS) in Universal Terrestrial Radio Access (UTRA) or in Evolved Universal Radio Access (E-UTRA) describes techniques for transmission of MBMS-bearer service in UTRA or E-UTRA, such as point-to-multipoint transmission, and selective combining and transmission mode selection between point-to-multipoint and point-to-point bearer. 3GPP™ Long Term Evolution (LTE) is the name given to a project to improve the Universal Mobile Telecommunications System (UMTS) mobile phone or device standard to cope with future requirements. The 3GPP™ may define one or more specifications for a next generation of mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). Information about MBMS may be found in the 3GPP™ website, www.3gpp.org Mobile, i.e., portable and wireless, devices are presently readily available and ubiquitously used. Such devices typically require power, such as from a battery, to run their processing and interfacing. Considering that the typical battery life is limited, ways of efficiently utilizing this limited resource, as well as providing good user experience are desirable.

Multimedia Broadcast Multicast Service, introduced in 3GPP™ Release 6, supports multicast/broadcast services in a cellular system. Release 6 of MBMS, however, is generally characterized as inefficient and may not be widely deployed. The current LTE working assumption pertaining to MBMS notification is that it may be implemented by using the MBMS Indication Channel (MICH), as defined in Release 6. The current 3GPP™ Release 6 LTE working assumption, however, requires a user equipment (UE) with MBMS subscription to monitor two indicator channels, i.e., both MICH and the Paging Indication Channel (PICH) to receive, respectively, MBMS service and normal or traditional cellular services—e.g., a cellular phone or voice call. An MBMS service, for example, is a mobile TV or video service. The current LTE working assumption or platform thus puts UE in a position where they may be consuming more battery charge. Therefore ways of receiving information about MBMS and yet still be conserving battery resources are highly desirable.

SUMMARY

The invention, in its several embodiments, includes a method of Multimedia Broadcast and Multicast Service (MBMS) notification in a radio access network where the method has the steps of: reading a paging indicator of a Paging Indication Channel (PICH), wherein said PICH carries a plurality of paging indicators adapted to provide MBMS notifications and non-MBMS notifications; and, if the paging indicator is set, then: (a) reading, from a data channel associated with said PICH, a reason associated with said paging indicator and a set of access information for a data channel comprising MBMS information; (b) reading MBMS information from said data channel comprising said MBMS information; and (c) configuring a user equipment (UE) based on said read MBMS information. Optionally, the data channel associated with said PICH may be a Paging Channel (PCH). The reason associated with the paging indicator may be for the purpose of notifying the UE to read said data channel comprising MBMS information. The MBMS information may be a MBMS point-to-multipoint control channel (MCCH).

Another exemplary embodiment of the present invention includes a method of Multimedia Broadcast and Multicast Service (MBMS) notification in a radio access network, where the method comprises the steps of: reading a paging indicator of a Paging Indication Channel (PICH), wherein said PICH carries a plurality of paging indicators adapted to provide MBMS notifications and non-MBMS notifications; and, if said paging indicator is set, then: (a) reading, from a data channel associated with said PICH, a reason associated with said paging indicator and a set of access information for a data channel comprising MBMS notification indicators; (b) reading at least one notification indicator of said data channel comprising said MBMS notification indicators; and (c) if said at least one notification indicator is set, then reading MBMS information from a data channel comprising said MBMS information; and configuring a user equipment (UE) based on said read MBMS information. The data channel associated with said PICH may be a Paging Channel (PCH). The reason associated with the paging indicator may be to notify the UE to read said data channel comprising said MBMS notification indicators. The data channel containing the MBMS notification indicators may be an MBMS Indication Channel (MICH). The data channel comprising the MBMS information is a MBMS point-to-multipoint control channel (MCCH).

An exemplary apparatus embodiment of the present invention is a user equipment (UE) device comprising: a radio communication interface adapted to communicate with an Evolved Universal Terrestrial Radio Access Network (E-UTRAN) device; and an indicator processing module adapted to read a paging indicator of a Paging Indication Channel (PICH) received from the E-UTRAN device, wherein said PICH carries a plurality of paging indicators adapted to provide MBMS notifications and non-MBMS notifications. The indicator processing module may be further adapted, if the paging indicator is set, then to read, from a data channel associated with said PICH, a reason associated with said paging indicator and a set of access information for a data channel comprising MBMS information; and to read MBMS information from said data channel comprising said MBMS information; and to configure said UE device based on said read MBMS information. The indicator processing module is further adapted to, if the paging indicator is set, then to read, from a data channel associated with said PICH, a reason associated with said paging indicator and a set of access information for a data channel comprising MBMS notification indicators; to read at least one notification indicator of said data channel comprising said MBMS notification indicators; and, if said at least one notification indicator is set, then to read MBMS information from a data channel comprising said MBMS information; and to configure said UE device based on said read MBMS information. The data channel associated with the PICH may be a Paging Channel (PCH). The reason associated with the paging indicator may be to notify said UE to read said data channel comprising MBMS information. The data channel comprising said MBMS information maybe a MBMS point-to-multipoint control channel (MCCH).

An exemplary embodiment of the present invention also includes a method of Multimedia Broadcast and Multicast Service (MBMS) notification in a radio access network, where the method comprises transmitting a paging indicator of a Paging Indication Channel (PICH), wherein said PICH carries a plurality of paging indicators adapted to provide MBMS notifications and non-MBMS notifications; and providing, in a data channel associated with said PICH, a reason associated with said paging indicator and a set of access information for a data channel containing MBMS information for use by a user equipment (UE) to configure itself. The data channel associated with the PICH may be a Paging Channel (PCH). The reason associated with the paging indicator may be to notify said UE to read said data channel containing MBMS information. The data channel containing said MBMS information may be a MBMS point-to-multipoint control channel (MCCH).

Another exemplary embodiment of the present invention includes An Evolved Universal Terrestrial Radio Access Network (E-UTRAN) device that comprises a radio communication interface adapted to communicate with a user equipment (UE); and an indicator generation module adapted to provide: a reason associated with a paging indicator; a set of access information for a data channel comprising Multimedia Broadcast and Multicast Service (MBMS) information; and MBMS notifications and non-MBMS notifications via a Paging Indication Channel (PICH) for use by a UE to configure itself. The data channel associated with said PICH may be a Paging Channel (PCH). The reason associated with the paging indicator may be to notify said UE to read said data channel comprising MBMS information. The data channel comprising said MBMS information may be a MBMS point-to-multipoint control channel (MCCH).

Another exemplary embodiment of the present invention system comprises: (a) a user equipment (UE); (b) a first Evolved Universal Terrestrial Radio Access Network (E-UTRAN) device adapted to generate paging identification via an indicator generation module itself adapted to provide: a reason associated with a paging indicator; a set of access information for a data channel comprising Multimedia Broadcast and Multicast Service (MBMS) information; and MBMS notifications and non-MBMS notifications via a Paging Indication Channel (PICH) for use by the UE to configure itself, and (c) a second E-UTRAN device comprising: a radio communication interface adapted to communicate with the UE and the first E-UTRAN device; and wherein the UE comprises: a radio communication interface adapted to communicate with an E-UTRAN device; and an indicator processing module adapted to read a paging indicator of a PICH received from the E-UTRAN device, wherein said PICH carries a plurality of paging indicators adapted to provide MBMS notifications and non-MBMS notifications. The first E-UTRAN device may be a Mobile Management Entity (MME) gateway and the second E-UTRAN device may be an eNodeB device. Another exemplary system embodiment of the present invention comprises: (a) a first node comprising a radio communication interface adapted to communicate with an E-UTRAN device; and an indicator processing module adapted to read a paging indicator of a PICH received from the E-UTRAN device, wherein said PICH carries a plurality of paging indicators adapted to provide MBMS notifications and non-MBMS notifications; and (b) a second node adapted to generate a paging identification via an indicator generation module wherein the indicator generation module is adapted to provide: a reason associated with a paging indicator; a set of access information for a data channel comprising Multimedia Broadcast and Multicast Service (MBMS) information; and MBMS notifications and non-MBMS notifications via a Paging Indication Channel (PICH) for use by the UE to configure itself.

BRIEF DESCRIPTION OF THE DRAWINGS

The present invention, in its several embodiments, is illustrated by way of example and not limitation in the figures of the accompanying drawings, and in which.

DETAILED DESCRIPTION

The embodiments of the present invention relate to Multimedia Broadcast and Multicast Service (MBMS), particularly those applied within the Universal Terrestrial Radio Access Network (UTRAN) and/or the Evolved Universal Terrestrial Radio Access Network (E-UTRAN). Although described in relation to UTRAN or E-UTRAN, the embodiments of the present invention may apply to other networks, wired or wireless, and to other specifications or standards, including those that may later be developed. One of ordinary skill in the art having the benefit of this disclosure, however, will appreciate that the devices, systems, and procedures described herein, may also be applied to other applications.

Multimedia services are generally services that handle several types of media, such as audio and video in a typically synchronized way from the user's point of view. A multimedia service may involve multiple parties, multiple connections, and the addition or deletion of resources and users within a single communication session. A broadcast service is generally a unidirectional point-to-multipoint service in which data may be transmitted from a single source to multiple UEs in the associated broadcast service area or in the appropriate cells. In general, a broadcast service may be construed as a push-type service. A multicast service, on the other hand, is typically a unidirectional point-to-multipoint (PTM) service in which data may be transmitted from a single source entity to a multicast group in the associated multicast service area or in the appropriate cells. Typically, only the user equipments (UE) or users that are subscribed to the specific multicast service and have joined the multicast group associated with the service may receive the multicast service. The multicast data may contain a group identifier indicating whether the data is of interest to all subscribers or to only the subset of subscribers belonging to a specific multicast group. In general, a user equipment (UE) does not need to subscribe to each broadcast service separately. An example of a multicast service is a sport event, which requires a subscription. Typically, broadcast services are provided to every MBMS-capable UE in the broadcast service area.

Figure 1:
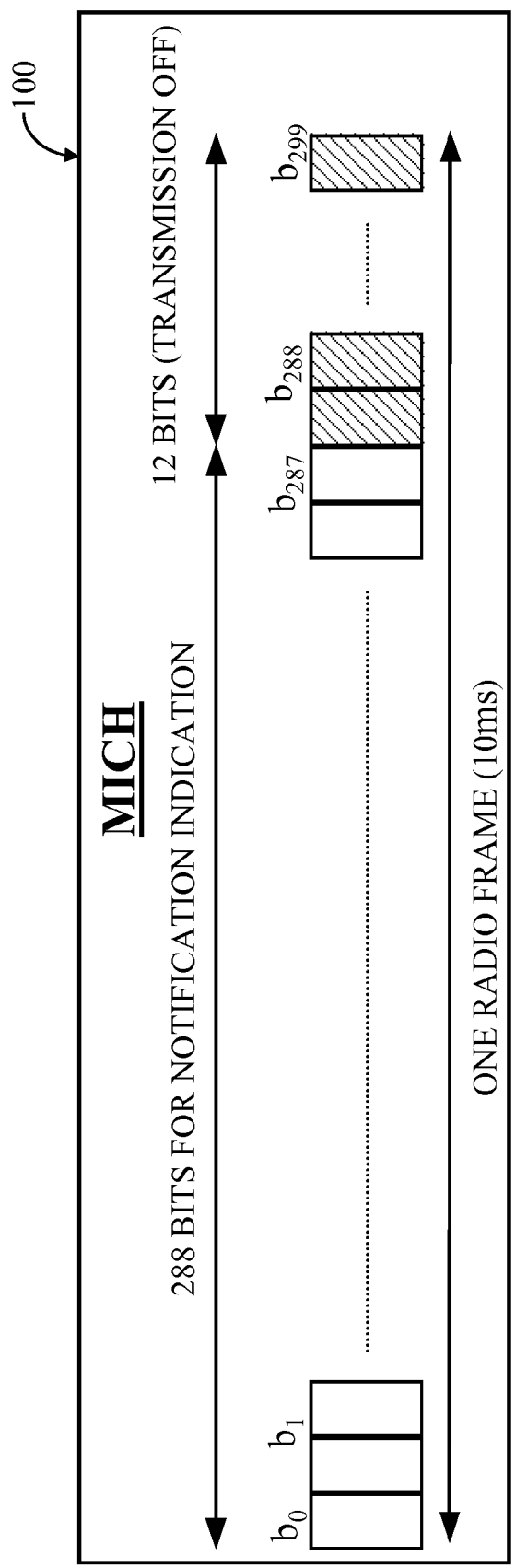
FIG. 1 is a diagram of an exemplary Multimedia Broadcast and Multicast Service (MBMS) Indication Channel (MICH), according to an embodiment of the invention.

FIG. 1 is a representation of an exemplary MBMS Indication Channel (MICH) 100 of 3GPP Release 6, which may also be used as an MBMS channel according to an embodiment of the invention. The current LTE working assumption transmits MBMS service notification via a MICH 100. A MICH 100 is a physical layer (PHY) channel without an upper layer corresponding transport channel. Such an upper layer may be construed to be a layer in the Open Systems Interconnection (OSI) Basic Reference Model. One MICH radio frame of length 10 ms consists of 300 bits, $b_0, b_1, \ldots, b_{299}$—of these, 288 bits, $b_0, b_1, \ldots, b_{287}$, are used to carry MBMS notification indicators (NIs). Via one or more of the MBMS notification indicators of the MICH, a UE, for example, may be notified of the one or more modifications of the MBMS point-to-multipoint control channel (MCCH). An MBMS notification indicator generally indicates when new information associated with the MBMS is to be transmitted on the MCCH. By notifying, via the MICH—particularly via the notification indicators—that the MCCH has new information, which may include information about changes to the MBMS, a UE is not necessarily required to continually monitor or read the MCCH, but rather may read the MCCH when accordingly notified via the MICH. Described in another way, typically a UE only reads the MCCH when a notification indicator carried by the MICH is set to "1" or "on," thus conserving processing resources and accordingly battery power, if appropriate. Thus, the UE may operate discontinuous reception (DRX) on the MCCH by monitoring the MICH to determine when the UE needs to receive or read the MCCH. The MCCH may contain MBMS change information, which may identify multimedia broadcast and multicast services, for which parameters are modified. Such parameters, for example, may include, but are not limited to, change in time, when and where to read the data associated with that service, and change in MBMS ID information. In some embodiments, MBMS change information may be contained in an MBMS Modified Services Information (MSI) message associated with the MCCH. MCCH may also contain other MBMS-related information, such as the start time of the MBMS data transmission in the cell. Variations of the structure of the MICH are expected and still be in the scope of the present invention.

Figure 2:
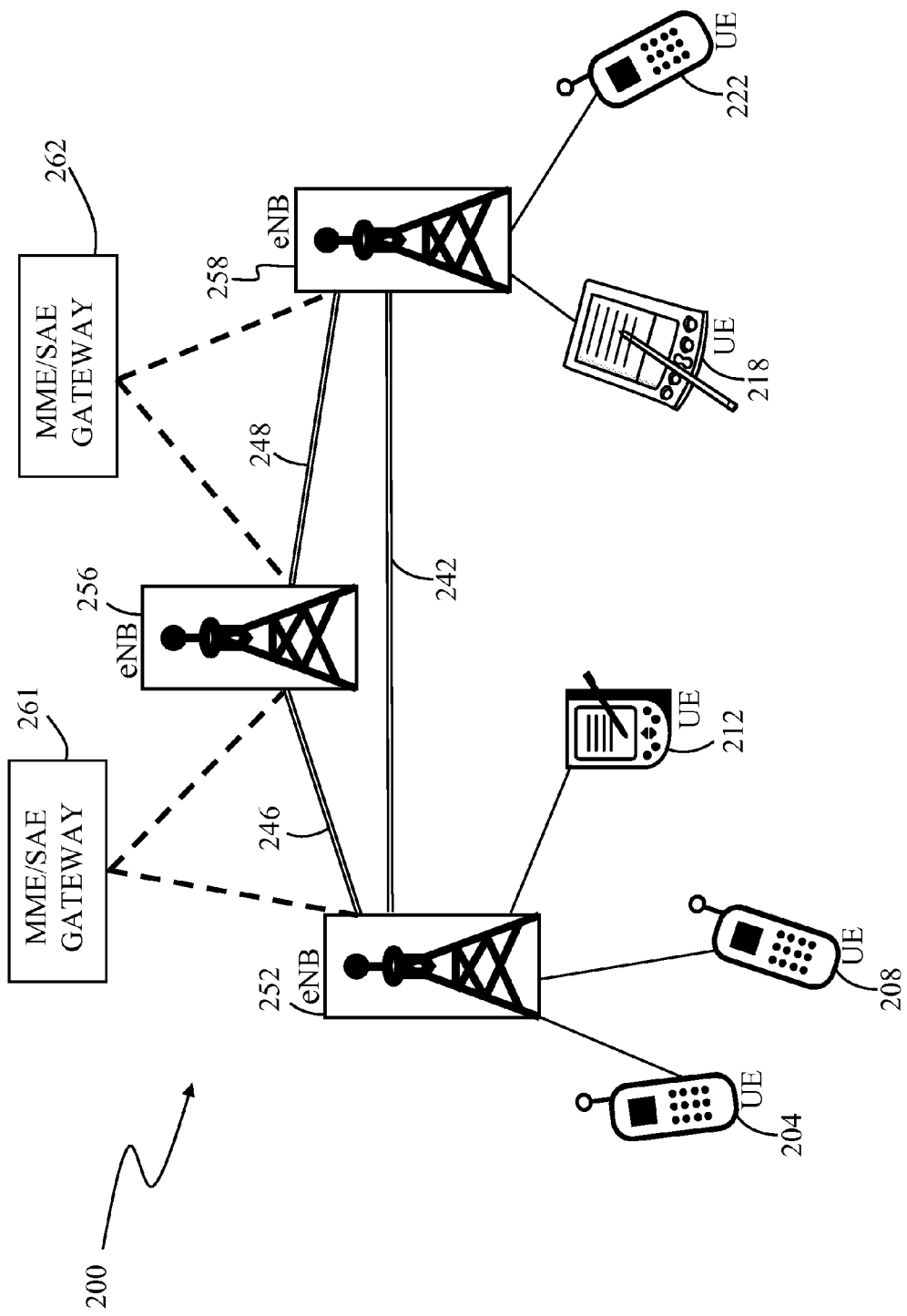
FIG. 2 is an exemplary communication system, according to an embodiment of the invention.

FIG. 2 is an exemplary diagram of a mobile and/or radio communication system 200, according to an embodiment of the invention where the exemplary system 200 is an exemplary E-UTRAN. An exemplary E-UTRAN may include eNBs, providing the E-UTRA user plane and control plane protocol terminations toward the UE. More particularly, the exemplary E-UTRAN of FIG. 2 may include of one or more base stations, typically referred to as eNodeBs or eNBs 252, 256, 258, providing the E-UTRA user plane and control plane protocol terminations toward the various UE. The eNBs may be interconnected with each other by means such as an X2 interface. The eNBs may also be connected by means of an interface such as a S1 interface to the Evolved Packet Core (EPC), more specifically to the Mobility Management Entity (MME) by means of an interface such as the S1-MME interface of 3GPP™ RAN3 and to the SAE Gateway by means of an interface such as the S1-U interface of 3GPP™. An interface, such as the S1 interface, may support a many-to-many relation between MME/SAE Gateways 261, 262 and eNBs 252, 256, 258. An eNodeB is an E-UTRAN device responsible for: radio transmission in a cell to the User Equipment and/or radio reception in the cell from the User Equipment. In general, an eNodeB handles the actual communication across the radio interface, covering a specific geographical area, where the specific geographical area may also be referred to as a cell. Depending on sectoring, one or more cells may be served by an eNodeB, and accordingly the eNodeB may support one or more mobile user equipment, or UE, depending on where the UE are located.

An eNodeB 252, 256, 258 may perform several functions, which may include but are not limited to, radio resource management, radio bearer control, radio admission control, connection mobility control, dynamic resource allocation or scheduling, and/or scheduling and transmission of paging messages, multicast, and broadcast information. Additionally, an eNodeB 252, 256, 258 of embodiments of the present invention may be adapted to send MBMS information using the Paging Indication Channel (PICH). However, typically an E-UTRAN device other than an eNodeB is adapted to generate a paging indication via a paging indication module. For example, typically in an LTE system, the paging may be originated by a Mobile Management Entity (MME) gateway.

In this exemplary system 200, there are three eNodeBs 252, 256, 258. The first eNodeB 252 manages, including providing service and connections to, three exemplary UEs 204, 208, 212. Another eNodeB 258 manages two exemplary UEs 218, 222. Examples of UE include mobile phones, personal digital assistants (PDAs), computers, and other devices that are adapted to communicate with or within this mobile communication system 200. The eNBs 252, 256, 258 of the present invention may communicate 242, 246, 248 with each other, via an X2 interface, as defined within 3GPP™. Each eNodeB may also communicate with a MME gateway and/or a System Architecture Evolution (SAE) gateway (not shown). The communication between an MME/SAE Gateway and an eNodeB is via an S1 interface, as defined within the Evolved Packet Core specification within 3GPP™. An exemplary MME hosts the function of the distribution of paging messages to the eNBs.

In general, the embodiments of the present invention utilize the Paging Indication Channel (PICH) to notify a user equipment to read or receive the appropriate MBMS information. By carrying information via the PICH, a UE need not monitor both PICH and MICH as currently defined within the 3GPP™ Release 6 specification, thereby providing a more efficient way of using battery power and/or minimizing processing requirement. In general, a multimedia broadcast and multicast service provides data that may be presented by a UE, such as an audio and/or visual data. A UE subscribing to an MBMS service, for example, may receive MBMS data, such as a movie, from an MBMS provider providing such service. The PICH of the present invention provides MBMS notifications via its paging indicators, by notifying the appropriate UE, e.g., those subscribing to this particular MBMS service, in order that the UE may configure themselves for MBMS data reception, e.g., of the movie, provided by the MBMS provider.

Figure 3:
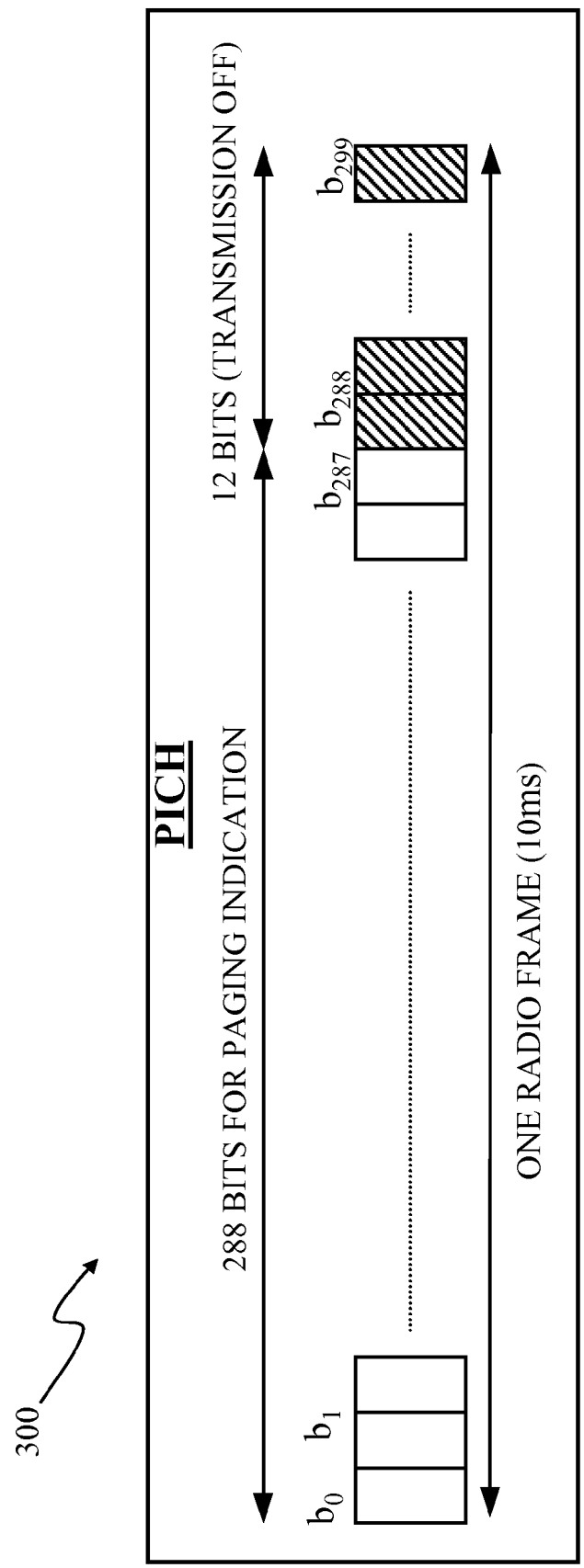
FIG. 3 is a diagram of an exemplary Paging Indication Channel (PICH), according to an embodiment of the invention.

FIG. 3 shows an exemplary Paging Indication Channel (PICH) 300 of the present invention. In general, a PICH is a fixed rate physical (PHY) channel typically without an upper layer corresponding transport channel configured to carry paging indicators. The Paging Channel (PCH) is a downlink transport channel. The PCH is typically transmitted over an entire cell. The transmission of the PCH is associated with the transmission of physical-layer generated paging indicators, to support efficient sleep-mode procedures. The PICH is a physical channel adapted to carry paging indicators. Typically, one PICH radio frame of length 10 ms consists of 300 bits, $b_0, b_1, \ldots, b_{299}$—of these, 288 bits, $b_0, b_1, \ldots, b_{287}$, are typically are used to carry paging indicators. In general, if a paging indicator in a certain frame is set to "1" or is "on," it is an indication that the one or more UEs associated with this paging indicator may read the corresponding frame of the associated physical paging channel (PCH) of the PICH. Described in another way, a paging indicator set in a PICH frame means that the paging message is transmitted on the Paging Channel (PCH) starting typically after the transmitted PICH frame. A PCH frame typically carries the paging information related to the paging indicators in the PICH frame. Typically, the PICH is received by a UE from an eNodeB.

The paging indicators of the PICH, in addition to providing non-MBMS notifications, may also be adapted to provide MBMS notifications. The paging indicators of the current 3GPP specification generally provide non-MBMS notifications, such as phone call notification and/or short message service (SMS) notification. Thus, the PICH of the present invention provides for MBMS notifications. The PICH example of the present invention is also configured to provide MBMS notifications, via the paging indicators of the PICH. For example, a UE within a system configured to receive MBMS and non-MBMS services need to read only the PICH rather than both a PICH and a MICH in order to determine whether to read certain related frames. Non-MBMS services may include traditional or conventional cellular services, such as phone call services, and short message services (SMS).

Figure 4:
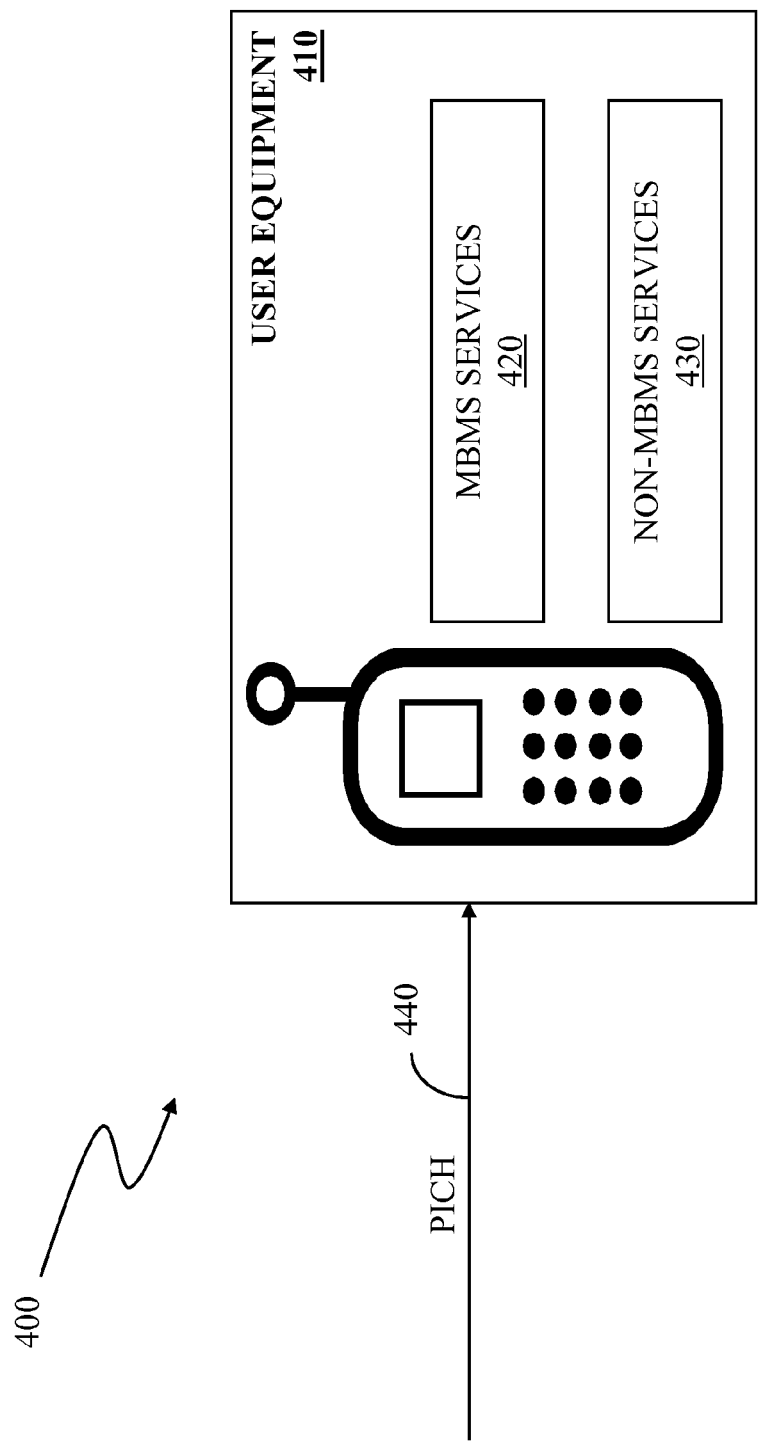
FIG. 4 is a diagram of an exemplary User Equipment (UE) configured to support exemplary services, according to an embodiment of the invention.

FIG. 4 shows an exemplary device 400 as user equipment 410 with representation of services to which such UE or user of such UE may subscribe. The embodiments of the present invention generally apply to UE 410 that subscribe to MBMS services 420. In the exemplary UE 410 of the present invention, the UE may be configured to receive MBMS services 420, as well as non-MBMS services 430 enabling a user to use such UE 410, for example, as a telephonic device, as well as a multimedia device adapted to receive and present a movie or song. The UE 410 of the present invention thus receives or reads the PICH 440, typically in a continuous or continual basis, which may be defined by the 3GPP specification or other specifications. Using the received PICH 440, the UE may accordingly listen or read the appropriate communications related to the services 420, 430 supported and/or subscribed by that UE 410.

Figure 5:
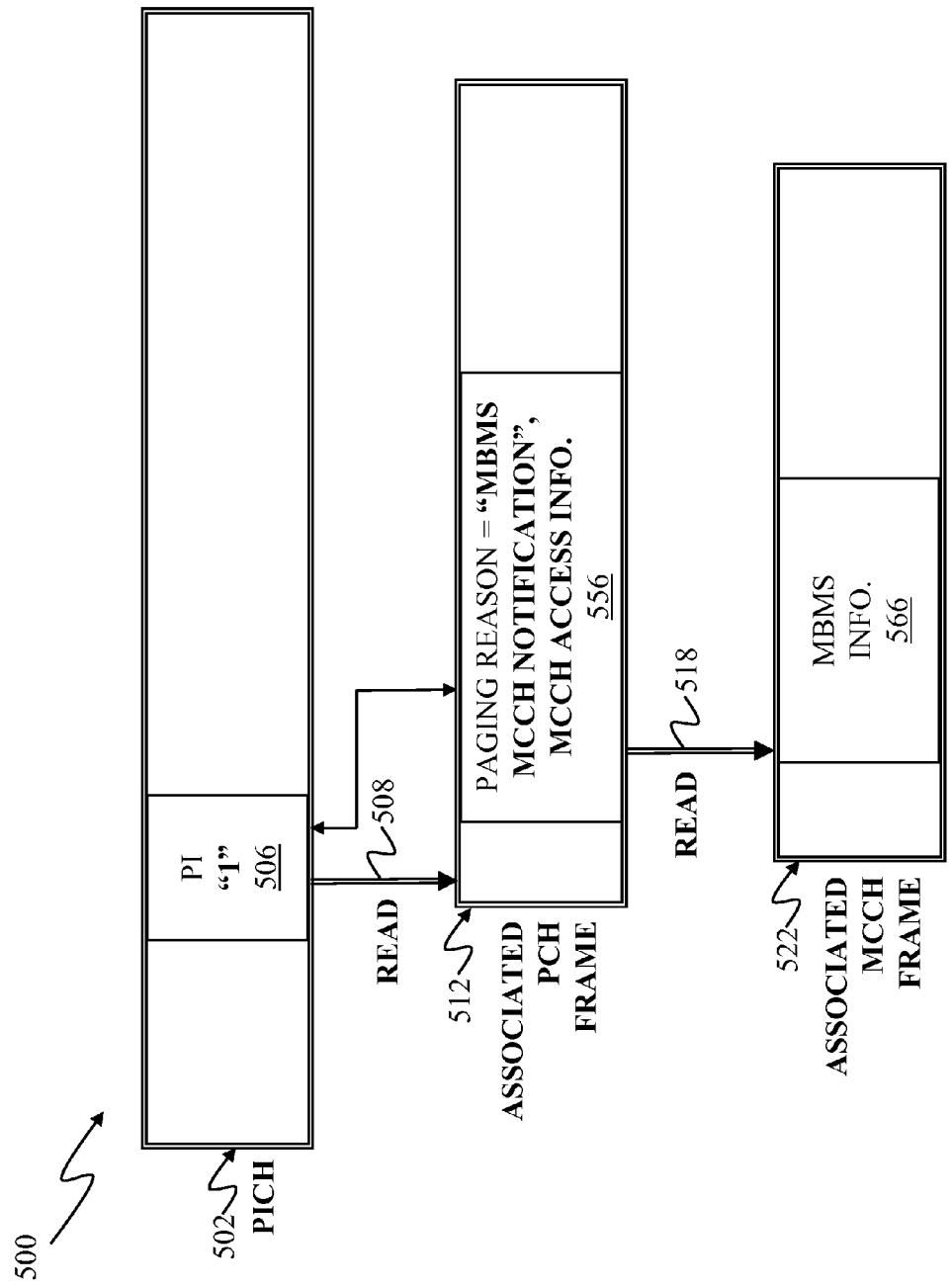
FIG. 5 is a flow diagram showing information read and/or processed by an exemplary UE, according to an embodiment of the invention.

FIG. 5 is a diagram 500 of an exemplary flow of information read and/or processed by an exemplary UE, according to an embodiment of the invention. Unlike UE of 3GPP Release 6 system that currently have need to monitor both PICH and MICH, the embodiments of the present invention reduce the monitoring burden on an UE by having need to only monitor or read the PICH (without necessarily monitoring MICH), and thereby offering the potential of drawing less battery power and requiring reduced processing resources than a state-of-the-art UE. In some embodiments, the E-UTRAN and/or the UTRAN specification need not allocate a MICH channel. Furthermore, by using the PICH for MBMS notifications, the various UE of the present invention may have a unified manner of receiving notifications of services, e.g., both MBMS and non-MBMS services.

In an exemplary embodiment, an eNodeB typically uses the PICH to notify a UE of changes in the MCCH. These changes in the MCCH generally relate to MBMS information. The MBMS information in the MCCH is typically read so as to prepare the UE for MBMS, as may be appropriate. For example, information in the MCCH may indicate to the UE when and from where, e.g., from which channel, it is to read the MBMS data so as to present the MBMS data on the user interface of the UE. Such MBMS data may be audiovisual data. The MCCH may also contain MBMS change information.

Referring to FIG. 5 generally, a paging indicator (PI) 506 in the PICH 502, calculated by higher layers for use for a certain UE, may be computed as a function of the SFN (System Frame Number) of the PCH radio frame during which the start of the PICH radio frame occurs. The manner of calculating a PI, as well, as the number of paging indicators per frame is disclosed in the "Physical channels and mapping of transport channels onto physical channels" specification document (3GPP TS 25.211 v700) and is known to those of ordinary skill in the art. If a paging indicator 506 in a certain PICH frame 502 is set to "1" or is "on," that set paging indicator is an indication that UE associated with this paging indicator may read 508 the corresponding PCH frame 512. In the corresponding PCH frame 512, the paging reason or cause associated with the paging indicator is provided 556. In an exemplary embodiment, one reason that may be added to the current PCH paging reasons is a "MBMS MCCH notification" reason 556. In addition to this reason, information for accessing the MCCH may also be provided. Such access information may include when and where to read the MCCH. The "MBMS MCCH notification" reason notifies the UE to read the MCCH so as to obtain MBMS information. The UE then accordingly reads 518 the MCCH frame 522 indicated in the PCH frame 512 for MBMS-related information 566. Such MBMS information 566, for example, may include information informing the UE when and where the next TV program is to be received, so as to be presented on the UE display for user viewing.

Generally, when there is a change in the MCCH, the upper layer may configure the PICH and the corresponding PCH so as to contain and indicate "MBMS MCCH notification" and this may be accomplished, for example, by setting the one or more appropriate bits or a paging indicator in the PICH. In general, the PICH pages, via the paging indicators, the relevant or affected one or more UE. The determination of which of the UE to page may depend on various conditions, e.g., subscription information, whether such service is broadcast or not, membership to a multicast group, and whether the UE is within a service area. To this extent, this paging indicator of the PICH serves as an indicator of MBMS notification for the corresponding MBMS modification period.

Using the PICH for MBMS notifications thus provides for a manner wherein a system, particularly an eNodeB, of the present invention may send and communicate initial, intermediate, and updated MBMS information. The manner, timing, and what information may be contained in the MCCH may be defined by the 3GPP specification or via other means known to those of ordinary skill in the art. One of ordinary skill in the art will appreciate that the timing of when the various information or channels 502, 512, 522 may be adjusted or modified so as to provide the UE sufficient time and/or resources to read and process the information in the appropriate channels, accordingly. For example, in some embodiments, the entire MCCH information may be transmitted periodically based on a "repetition period," e.g., as defined by the 3GPP specification. The "modification period" may be defined as an integer multiple of the repetition period. In some further embodiments, the MCCH may contain information labeled as critical or non-critical information. The critical information may be made up of a number of information, such as, MBMS neighboring cell information, MBMS service information, and MBMS radio bearer information. The less-than-critical or non-critical information may correspond to the MBMS access information. In some embodiments, changes to critical information may only be applied at the first MCCH transmission of a modification period and in the beginning of each modification period. In some embodiments, the network may transmit the MBMS change information, including MBMS services IDs whose MCCH information is modified, at that modification period. MBMS change information may be repeated at least once in each repetition period of that modification period. In other embodiments, critical MCCH information may only be changed at the beginning of a modification period. In some embodiments, the paging indicator functioning as an MBMS notification indicator, corresponding to the service group of every affected service may be set continuously or continually during the entire modification period preceding the first change in MCCH information related to a given service.

Figure 6:
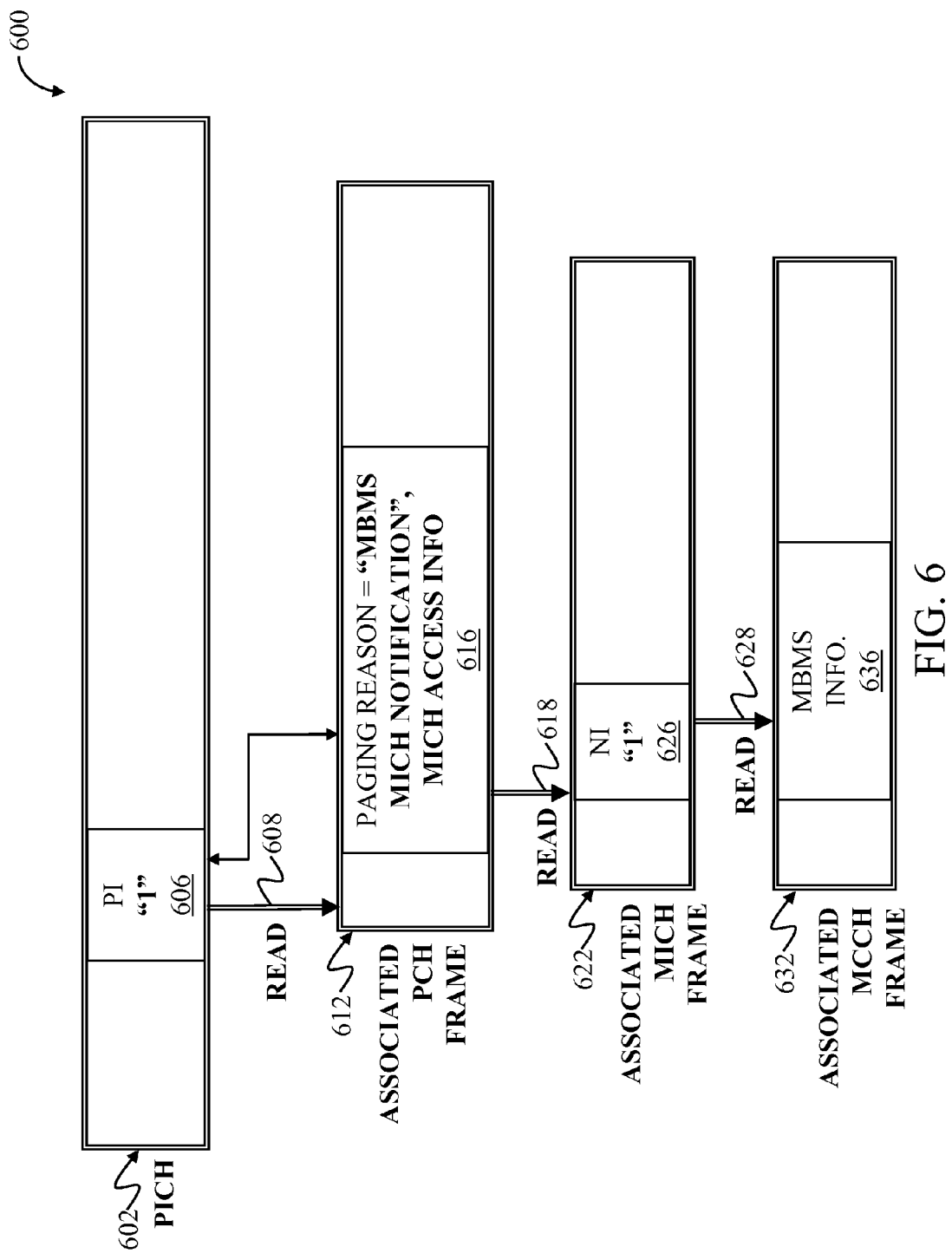
FIG. 6 is another flow diagram showing the information read and/or processed by an exemplary UE, according to an embodiment of the invention.

FIG. 6 is another flow diagram 600 showing the information that may be read and/or processed by an exemplary UE, according to an embodiment of the invention. In general, via the paging indicator 606 of the a PICH 602, a UE may be notified that a MICH signal is indicating changes the in MCCH. In this embodiment, the UE need not necessarily monitor both MICH and PICH, and by directly monitoring the PICH and not the MICH, the UE may draw less battery power than the state-of-the-art UE. There may be, however, a slight delay in reading the MCCH, when consideration is given that the PICH and the MICH are first read prior to the MCCH. Considering, however that the nature of the MBMS service and the information carried or contained in the MCCH is typically not time-critical information, a slight delay may be acceptable and may even not be performance issue for MBMS. Moreover, since the nature of the MBMS service, and the information carried in the MCCH is periodically repeated, a slight delay for non-time-critical information may be acceptable. Furthermore, while the present invention has several advantages, one advantage of this exemplary embodiment is that there remains a MICH channel which enables MBMS-only devices or various UE to work properly within 3GPP Release 6 systems.

Similar to FIG. 5 is the flow diagram of FIG. 6 where the paging indicator (PI) 606 in the PICH 602 is calculated by higher layers as mentioned above. If the appropriate paging indicator 606 in a certain frame is set to "1" or "on," it is an indication that UE associated with this paging indicator 606 may read 608 the corresponding frame of the associated PCH 612. In the corresponding PCH frame 612, the paging reason is provided. In this exemplary embodiment, one reason or cause that may be added to the current PCH paging reasons is the "MBMS MICH notification" reason 616, indicating to the UE to reach the appropriate MICH. Information on accessing the MICH may also be included in the PCH frame 612. This access information may include when to read the MICH, as well as what channel carries the MICH. Based on the access information 616, the appropriate MICH frame 622 may then be read 618. If the appropriate MBMS notification indicator 626 in the associated MICH frame 622 is set to "1," 626, then the corresponding or associated MCCH 632, typically associated with the NI 626, may then be read 628 for MBMS information 636. Furthermore, when there is a change in the MCCH, the upper layer may configure the PICH and the corresponding PCH, so as to contain and indicate "MBMS MICH notification" which may be caused, for example, by setting the appropriate one or more bits or paging indicators in the PICH. In general, the PICH pages, via the paging indicators, the various relevant or otherwise affected UE. The determination of which of the various UE to page may depend on various conditions, e.g., subscription information, whether such service is broadcast or not, membership to a multicast group, and whether the UE is within a service area. To this extent, this paging indicator of the PICH serves as an indicator of MBMS notification for the corresponding MBMS modification period.

Using the PICH for MBMS notifications thus provides for a manner wherein a system, particularly an eNodeB, of the present invention may send and communicate initial, intermediate, and updated MBMS information. The manner, timing, and information content that may be contained in the MCCH may be defined by the 3GPP specification or via other means known to those of ordinary skill in the art. For example, in some embodiments some of the timing alignments between channels may need slight adjustment. One of ordinary skill in the art will appreciate that the timing of when the various information or channels 502, 512, 522 may be adjusted or modified so as to provide the UE sufficient time and/or resources to read and process the information in the appropriate channels accordingly.

The above embodiments thus enable an MBMS-capable UE, e.g., in LTE, to receive MBMS service without having to keep monitoring the MICH channel. Furthermore, the above embodiments may work well for one or more combined UE, which may be those that are adapted to handle services that include both MBMS and non-MBMS. Furthermore, considering that the available MBMS services, like Mobile TV services, are or may not be large in number and the changes in the MCCH are typically infrequent, then the utilizing of the embodiments of the present invention may not be expected to substantially impact adverse system performance. Furthermore, considering that many more LTE UE are adapted to stay in the LTE-Active state for a much longer period than in Release 6 UMTS, the embodiments of the present invention utilizing PICH to notify MBMS changes are not expected to substantially impact system performance adversely.

Using the PICH for MBMS notifications thus provides for a manner wherein a system, particularly an eNodeB, of the embodiments of the present invention may send and communicate initial, intermediate, and updated MBMS information. The manner, timing, and what information may be contained in the MCCH may be defined by the 3GPP specification or via other means known to those of ordinary skill in the art. One of ordinary skill in the art will appreciate that the timing of when the various information or channels 602, 612, 622, 632 may be adjusted or modified so as to provide the UE sufficient time and/or resources to read and process the information in the appropriate channels accordingly.

Figure 8:
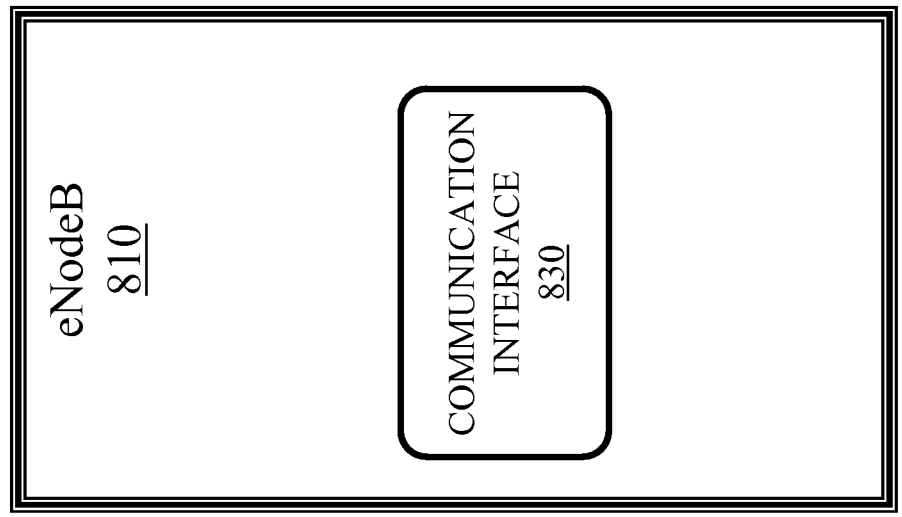
FIG. 8 is a high-level block diagram of an exemplary eNodeB, according to an embodiment of the invention.
Figure 7:
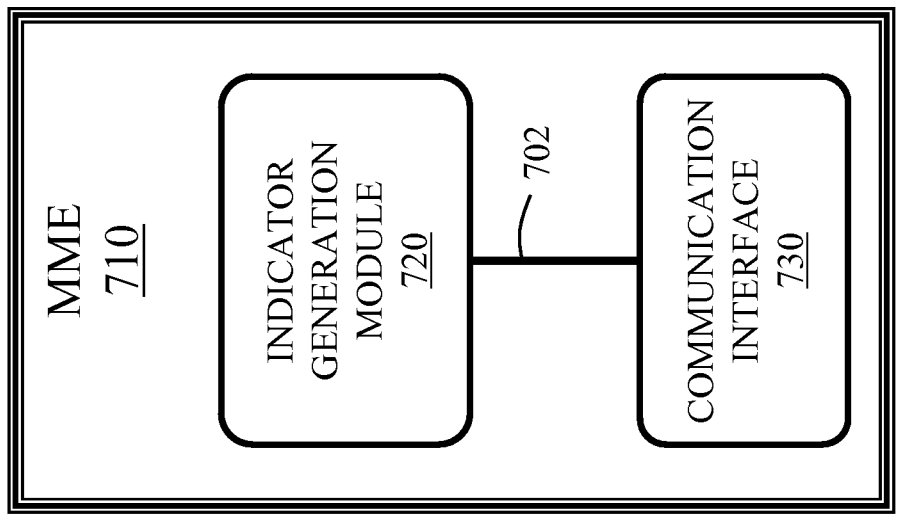
FIG. 7 is a high-level block diagram of an exemplary MME, according to an embodiment of the invention.

FIG. 7 is a high-level functional block diagram of an exemplary E-UTRAN device that is an MME gateway 710, according to an embodiment of the invention. In general, the MME device 710 comprises a plurality of modules where the modules include, for example in the case of an MME gateway, an indicator generation module (IGM) 720 adapted to set the paging indicators in the PICH so as to notify the one or more relevant or appropriate UE in the system to read MBMS-related information in the MCCH. In some embodiments, the IGM sets paging indicators based on membership of a UE to one or more multicast groups, or based on other conditions. Furthermore, the IGM 720 provides a reason for notification and/or access information in the appropriate PCH frame. In some embodiments, the IGM 720 may also set the notification indicator in the appropriate MICH. The IGM 720 may also provide other information, such as MBMS information carried by the MCCH. The MME gateway 710 may also include a radio communication interface 730, adapted to enable the MME gateway 710 to communicate with the various UE it manages via one or more eNodeBs. The IGM 720 and the communication interface 730 may interface with each other, for example, via a shared memory, a data line, a bus, dedicated signal paths, or one or more channels 702. Furthermore, these modules may be embodied in hardware, as a set of program instructions, e.g., software, or both, i.e., firmware. Other modules may also be included, not shown, which may depend on the functions being performed by the MME gateway 710, such as connection management and a data transfer function. FIG. 8 is a high-level block diagram of an exemplary eNodeB 810 having a communication interface 830 allowing the eNodeB 810 to function in some embodiments as a communication intermediary between the MME gateway 710 and one or more UE.

Figure 9:
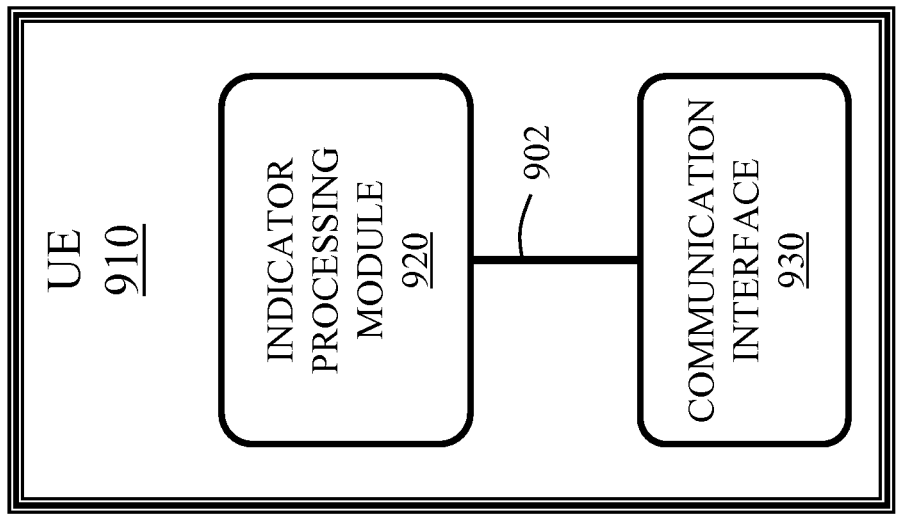
FIG. 9 is a high-level block diagram of an exemplary UE, according to an embodiment of the invention.

FIG. 9 is a high-level functional block diagram of an exemplary UE 910, according to an embodiment of the invention. In general, the UE 910 includes an indicator processing module (IPM) 920 adapted to read the PICH and accordingly process and interpret the paging indicators of the PICH. Based on the setting of the paging indicator in the PICH, the IPM 920 may accordingly read the PCH to determine the reason for notification and to obtain access information of the appropriate channel to read. Furthermore, MBMS information may be read from the MCCH and accordingly processed so as to prepare and configure the UE, for example, to receive the MBMS service. The UE 910 may also include a radio communication interface 930 adapted to enable the UE 910 to communicate with an eNodeB, particularly to receive PICH, PCH, MICH, and/or MCCH information. Other modules may also be added but not shown, which may depend on the processes and functions of the UE, e.g., a display controller, a speaker controller, and a codec module. The IPM 920 and the communication interface 930 may interface with each other, for example, via a shared memory, a data line, a bus, dedicated signal paths, or one or more channels 902.

Furthermore, these modules may be embodied in hardware, as a set of program instructions, e.g., software, or both, i.e., firmware.

The modules described in FIGS. 7, 8 and 9 may be combined or further subdivided and still remain within the scope of the present invention.

Embodiments of the present invention may be used in conjunction with networks, systems, and devices that may employ PICH, and/or MICH. Although the embodiments of the present invention described herein are exemplified using E-UTRA, E-UTRAN, and 3GPP LTE, the features of the present invention may be applied to other systems and networks that utilize indicators. For example, the embodiments of the present invention may also be applied on or within other radio systems, including, but not limited to WLAN, IEEE 802.16, IEEE 802.20 networks. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. The embodiments of the present invention may be embodied in a set of program instructions, e.g., software, hardware, or both—i.e., firmware. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of Multimedia Broadcast and Multicast Service (MBMS) notification in a radio access network, the method comprising:
   reading, by a user equipment (UE), a paging indicator of a Paging Indication Channel (PICH), wherein said PICH carries a plurality of paging indicators adapted to provide MBMS notifications and non-MBMS notifications; and
   if said paging indicator is set, then
      reading, by said UE, from a first data channel associated with said PICH, a reason associated with said paging indicator and a set of access information for a second data channel comprising MBMS information;
      accessing, by said UE, said second data channel based on a portion of said set of access information;
      reading, by said UE, MBMS information from said second data channel comprising said MBMS information; and
      configuring said UE based on said read MBMS information.

2. The method of claim 1 wherein said first data channel associated with said PICH is a Paging Channel (PCH).

3. The method of claim 1, wherein said reason is to notify said UE to read said second data channel comprising MBMS information.

4. The method of claim 1, wherein said second data channel comprising said MBMS information is a MBMS point-to-multipoint control channel (MCCH).

5. A method of Multimedia Broadcast and Multicast Service (MBMS) notification in a radio access network, the method comprising:
   reading a paging indicator of a Paging Indication Channel (PICH), wherein said PICH carries a plurality of paging indicators adapted to provide MBMS notifications and non-MBMS notifications; and
   if said paging indicator is set, then
      reading, from a first data channel associated with said PICH, a reason associated with said paging indicator and a set of access information for a second data channel comprising MBMS notification indicators;
      reading at least one notification indicator of said first data channel comprising said MBMS notification indicators; and if said at least one notification indicator is set, then reading MBMS information from said second data channel comprising said MBMS information; and configuring a user equipment (UE) based on said read MBMS information.

6. The method of claim 5 wherein said first data channel associated with said PICH is a Paging Channel (PCH).

7. The method of claim 5, wherein said reason is to notify said UE to read said second data channel comprising said MBMS notification indicators.

8. The method of claim 5, wherein said second data channel containing said MBMS notification indicators is a MBMS Indication Channel (MICH).

9. The method of claim 5, wherein said second data channel comprising said MBMS information is a MBMS point-to-multipoint control channel (MCCH).

10. A user equipment (UE) device comprising:
a radio communication interface adapted to communicate with an Evolved Universal Terrestrial Radio Access Network (E-UTRAN) device; and
an indicator processing module adapted to read a paging indicator of a Paging Indication Channel (PICH) received from the E-UTRAN device, wherein said PICH carries a plurality of paging indicators adapted to provide MBMS notifications and non-MBMS notifications;
wherein the indicator processing module is further adapted to, if the paging indicator is set, then to
read, from a first data channel associated with said PICH, a reason associated with said paging indicator and a set of access information for a second data channel comprising MBMS information; and to
read MBMS information from said second data channel comprising said MBMS information; and to
configure said UE device based on said read MBMS information.

11. The UE of claim 10 wherein said first data channel associated with said PICH is a Paging Channel (PCH).

12. The UE of claim 10, wherein said reason is to notify said UE to read said second data channel comprising MBMS information.

13. The UE of claim 10, wherein said second data channel comprising said MBMS information is a MBMS point-to-multipoint control channel (MCCH).

14. A method of Multimedia Broadcast and Multicast Service (MBMS) notification in a radio access network, the method comprising:
transmitting a paging indicator of a Paging Indication Channel (PICH), wherein said PICH carries a plurality of paging indicators adapted to provide MBMS notifications and non-MBMS notifications; and
providing, in a first data channel associated with said PICH, a reason associated with said paging indicator and a set of access information for a second data channel containing MBMS information for use by a user equipment (UE) to configure itself.

15. The method of claim 14 wherein said first data channel associated with said PICH is a Paging Channel (PCH).

16. The method of claim 14, wherein said reason is to notify said UE to read said second data channel containing MBMS information.

17. The method of claim 14, wherein said second data channel containing said MBMS information is a MBMS point-to-multipoint control channel (MCCH).

18. An Evolved Universal Terrestrial Radio Access Network (E-UTRAN) device comprising:
a radio communication interface adapted to communicate with a user equipment (UE); and
an indicator generation module adapted to provide: a reason associated with a paging indicator; a set of access information for a data channel comprising Multimedia Broadcast and Multicast Service (MBMS) information; and MBMS notifications and non-MBMS notifications via a Paging Indication Channel (PICH) for use by a UE to configure itself.

19. The E-UTRAN device of claim 18 wherein said data channel associated with said PICH is a Paging Channel (PCH).

20. The E-UTRAN device of claim 18, wherein said reason is to notify said UE to read said data channel comprising MBMS information.

21. The E-UTRAN device of claim 18, wherein said data channel comprising said MBMS information is a MBMS point-to-multipoint control channel (MCCH).

22. A system comprising:
a user equipment (UE);
a first Evolved Universal Terrestrial Radio Access Network (E-UTRAN) device adapted to generate paging identification via an indicator generation module itself adapted to provide: a reason associated with a paging indicator; a set of access information for a data channel comprising Multimedia Broadcast and Multicast Service (MBMS) information; and MBMS notifications and non-MBMS notifications via a Paging Indication Channel (PICH) for use by the UE to configure itself; and
a second E-UTRAN device comprising:
a radio communication interface adapted to communicate with the UE and the first E-UTRAN device; and
wherein the UE comprises:
a radio communication interface adapted to communicate with an E-UTRAN device; and
an indicator processing module adapted to read a paging indicator of a PICH received from the E-UTRAN device, wherein said PICH carries a plurality of paging indicators adapted to provide MBMS notifications and non-MBMS notifications.

23. The system of claim 22 wherein the first E-UTRAN device is a Mobile Management Entity (MME) gateway and the second E-UTRAN device is an eNodeB device.

24. A system comprising:
a first node comprising a radio communication interface adapted to communicate with an E-UTRAN device; and an indicator processing module adapted to read a paging indicator of a PICH received from the E-UTRAN device, wherein said PICH carries a plurality of paging indicators adapted to provide MBMS notifications and non-MBMS notifications and
a second node adapted to generate a paging identification via an indicator generation module wherein the indicator generation module is adapted to provide: a reason associated with a paging indicator; a set of access information for a data channel comprising Multimedia Broadcast and Multicast Service (MBMS) information; and MBMS notifications and non-MBMS notifications via a Paging Indication Channel (PICH) for use by the UE to configure itself.

25. A method of Multimedia Broadcast and Multicast Service (MBMS) notification in a radio access network, the method comprising:
reading, by a user equipment (UE), a paging indicator of a Paging Indication Channel (PICH), wherein the PICH carries a plurality of paging indicators adapted to provide MBMS notifications and non-MBMS notifications; and if the paging indicator is set, then
reading, by the UE, from a first data channel associated with the PICH, a reason associated with the paging indicator and a set of access information for a second data channel comprising MBMS information;
accessing, by the UE, the second data channel based on a portion of the set of access information; and
reading, by the UE, MBMS information from the second data channel comprising the MBMS information.

26. The method of claim 25 wherein the accessing is further based on the read reason.

27. The method of claim 26, wherein the read reason is to notify the UE to read the second data channel comprising MBMS information.

28. The method of claim 25, further comprising, configuring the UE based on the read MBMS information.

* * * * *